Feb. 19, 1929.
M. B. MILLS
1,702,791
WEIGHING SCALE
Filed Aug. 9, 1926 2 Sheets-Sheet 1
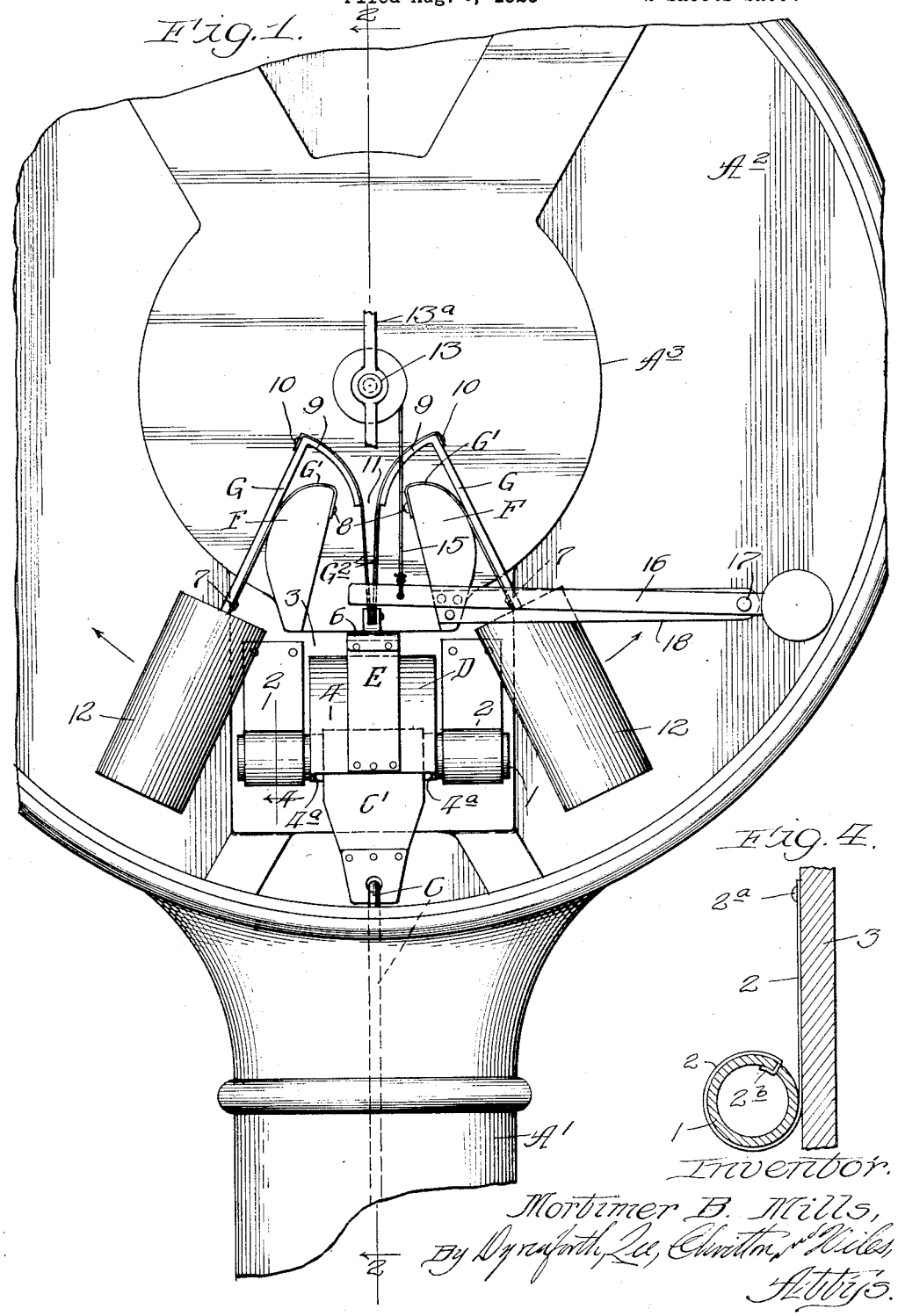

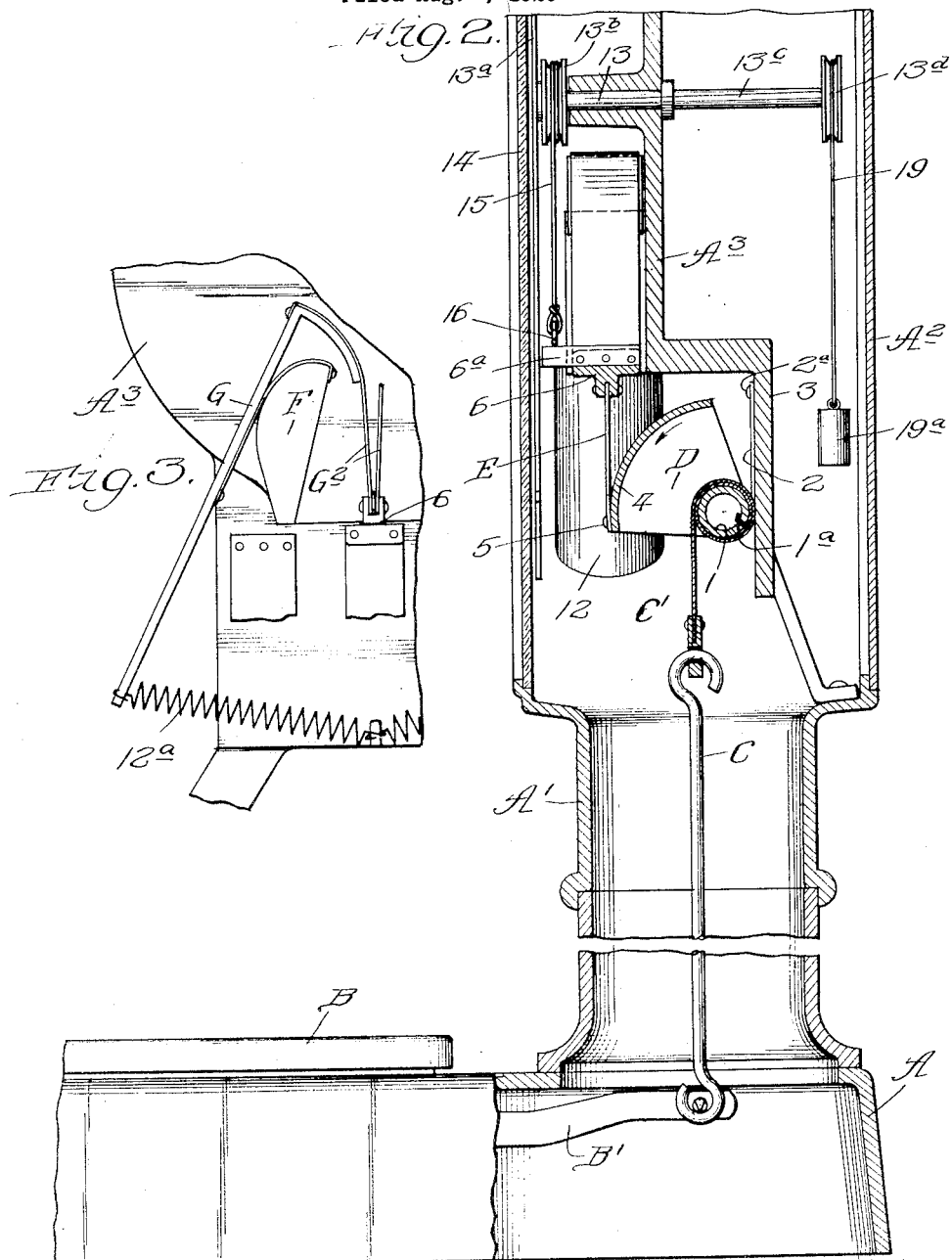

Patented Feb. 19, 1929.

1,702,791

UNITED STATES PATENT OFFICE.

MORTIMER B. MILLS, OF CHICAGO, ILLINOIS, ASSIGNOR TO MILLS NOVELTY COMPANY, OF CHICAGO, ILLINOIS, A CORPORATION OF ILLINOIS.

WEIGHING SCALE.

Application filed August 9, 1926. Serial No. 128,253.

This invention relates particularly to a weighing scale; and the primary object is to provide an improved scale of compact construction and great accuracy.

While the invention is applicable to scales of various kinds, it was primarily designed for use in connection with a platform scale for weighing people. Scales of this character are usually provided with coin-controlled means, enabling a customer to obtain his weight, after first inserting a suitable coin.

The invention is illustrated in a simple embodiment in the accompanying drawings, embodied in a platform scale. The drawings do not, however, show the scale equipped with coin-controlled mechanism for controlling the operation of the scale, inasmuch as such mechanism forms no part of the present invention.

In the drawings—

Fig. 1 is a broken front elevational view of the improved scale, the glass dial-plate being removed; Fig. 2, a broken vertical sectional view taken as indicated at line 2 of Fig. 1; Fig. 3, a broken view illustrating a slight modification of the invention; and Fig. 4, a broken vertical sectional view taken as indicated at line 4 of Fig. 1.

In the embodiment shown in the drawings, A designates a base from which rises a tubular standard A' equipped at its upper end with a casing A² within which is mounted a spider A³; B, a weighing platform mounted on beams B' housed in the base A; C, a link connected with a member of the beams B'; D, an arcuate actuating member connected with the link C; E, a flexible connecting member connected with the member D; F, F, a pair of stationary cams rigidly mounted on the lower portion of the front face of the spider A³; and G, G, a pair of weight-levers working on shifting fulcrums on the cams F, said levers being connected by means of flexible members G' with the cams F, and by means of flexible members G² with the connecting member E.

When a person steps on the platform B, the lever B' is thereby depressed, drawing the connecting rod C downwardly. This connecting rod is joined by a flexible member C' to a rolling shaft 1 which is formed integrally with the member D. The member C' preferably is a thin flexible metal strap which passes partly about the shaft 1 and is secured thereto at the point 1ª. The end-portions of the shaft 1 are supported by flexible metal straps 2 whose upper ends are secured at points 2ª to a bracket 3 carried by the spider A³. The lower end-portions of the straps 2 are carried around the shaft and secured to the shaft at points 2ᵇ (see Fig 4). The straps 2 bear against the front face of the bracket 3, and the shaft 1 thus has a rolling support on the bracket 3. The member D comprises an arcuate portion 4 constituting a portion of a cylinder, this arcuate portion being carried by radial arms 4ª rigidly secured to the shaft 1.

The connecting member E preferably comprises a thin flexible steel band having its lower end connected at the point 5 with the lower edge-portion of the member 4. The upper end of the strap E is connected to a clip 6, which, in turn, is connected with the lower ends of the straps G². The straps G² and also the straps G' preferably are thin flexible metal strips.

The levers G are supported on the cams F by means of the straps G', the lower ends of said straps being connected at points 7 with the levers. The upper portions of the straps G' pass about the upper portions of the cams F and are secured to the cams at points 8. The levers G are equipped at their upper portions with arcuate extensions 9 over which the upper portions of the straps G² pass, the straps G² being secured to the levers at points 10. The extensions 9 curve inwardly and downwardly from the main portions of the levers G, and a space 11 between the free ends of the members 9 affords a passage for the straps G². The levers are fitted with weights 12.

The construction described constitutes the important mechanism of the invention. Any suitable means may be employed for indicating weight. In the illustration given, a pointer-shaft 13 is journalled in the spider A³ and is equipped at its front end with a pointer 13ª which plays back of the glass dial 14 with which the casing A² is fitted. The shaft 13 is equipped with a grooved wheel 13ᵇ with which is connected a cord 15 whose lower end is secured to a counterbalanced lever 16 which is pivoted at 17 upon a stationary bracket 18. The free end of the lever 16 rests normally upon a projection 6ª carried by the clip 6. When the clip 6 descends in the weighing operation, the lever 16 falls and actuates the shaft 13, thus turning the pointer 13ª to indicate the weight on the dial.

The shaft 13 is provided with a rearward extension 13ᶜ which is fitted with a grooved wheel 13ᵈ to which is attached a cord 19 from which is suspended a weight 19ª. This weight is adapted to return the pointer to the zero position when the weight is removed from the platform B.

The spider A³ is rigidly mounted in the casing A² in any suitable manner (not shown).

The operation may be stated briefly:

When a person stands on the platform B, the beam-lever B' is depressed, thus forming the connecting rod C downwardly. This causes the shaft 1 to roll downwardly along the front surface of the bracket 3, the straps 2 supporting the shaft, however. As the shaft 1 rolls downwardly, the segmental portion 4 of the member D moves in the direction indicated by the arrow in Fig. 2. This causes the strap E to be drawn downwardly, the arcuate member 4 rolling against the strap as the movement continues. Thus, the clip 6 is lowered, drawing the straps G² downwardly and causing the levers G to swing about their fulcrums on the cams F. The fulcrum-points shift continuously, and it will be noted that the shape of the cams is such that the actuated portions of the levers grow shorter and shorter, so that the counterweights 12 act on constantly lengthening arms. That is, the counterweight arms continuously increase in length during the descent of the scale-beam B', while the arms actuated from the scale-beam grow shorter and shorter. By this means, it is possible to weight a heavy body on the platform B without using long lever-arms and without using heavy counterweights. The connecting straps G² partially unwrap from the arcuate members 9 as the levers G swing upwardly in the direction indicated by the arrows in Fig. 1.

It will be noted that rolling movements are employed at all points, and thus the friction is reduced to a minimum. The cams F may be of any desired shape, depending upon the gain in leverage which may be desired.

In the modification shown in Fig. 3, the construction is the same as previously described, except that a counterbalance spring 12ª takes the place of a counterweight 12, as the equivalent thereof; the remaining parts are designated by reference characters corresponding with those used in the previously described construction.

The invention has been described in detail for clearness of understanding only, and no unnecessary limitations should be understood therefrom, but the appended claims should be construed as broadly as permissible, in view of the prior art. In a small weighing-scale it may be possible to employ a single lever G. Ordinarily, the use of a pair of such levers is preferred, however.

What I regard as new, and desire to secure by Letters Patent, is:

1. A weighing scale comprising a pair of cam-like stationary fulcrums, counterweighed levers adapted to roll on said fulcrums, straps connected with the upper portions of said levers, a strap connected with said first-mentioned straps, a swinging arcuate member with which said second-mentioned strap is connected, a load-platform, and means for transmitting stress from said load-platform to said arcuate member.

2. A weighing scale comprising a pair of cam-like fulcrums, straps secured thereto and extending about the curved surfaces of said fulcrums, counterweighed levers connected with said straps and adapted to roll on said fulcrums, arcuate extensions for said levers, straps secured to said levers and passing about said arcuate extensions, a rolling shaft equipped with an arcuate member having secured thereto a strap connected with said last-mentioned straps, straps supporting said rolling shaft, a strap secured to and adapted to rotate said shaft, a load-platform, and connections between said load-platform and said last-mentioned strap.

3. A weighing scale comprising a pair of cam-like fulcrums separated by a space, levers adapted to roll on said fulcrums with shifting fulcrum-points, said levers having at their upper portions inwardly and downwardly extending arcuate portions adapted to work through the space between said cam-like fulcrums, straps connected with said levers and extending over said arcuate extensions, a rolling shaft equipped with an arcuate member, a strap secured to the lower portion of said arcuate member and connected with said first-mentioned straps, straps supporting said rolling shaft, an actuating strap connected with said rolling shaft, a load-platform, and connections between said load-platform and said last-mentioned strap.

4. A weighing scale comprising a pair of cam-like fulcrums, levers mounted to turn thereon with rolling contact, straps connected with said levers, a load-platform, connecting means between said load-platform and said straps for transmitting stress thereto, a weight-indicating pointer having a shaft equipped with a wheel, a flexible member secured to said wheel, and a lever connected to said flexible member adapted to actuate said shaft, said lever being adapted to follow downwardly during the weighing operation.

5. A weighing scale comprising a pair of supports, a pair of counterweight levers fulcrumed on said supports, a load-platform and means for transmitting stress from said load-platform to said counterweight levers comprising a strap-supported shaft equipped with an arcuate member of larger radius than the shaft, a strap attached to said shaft and connected to said load-platform, a strap attached to said arcuate member, and means connecting said last-mentioned strap to said counterweight levers.

MORTIMER B. MILLS.